United States Patent
Coker

(10) Patent No.: US 7,767,610 B1
(45) Date of Patent: Aug. 3, 2010

(54) METAL NANOPARTICLES AS A CONDUCTIVE CATALYST

(75) Inventor: Eric N. Coker, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 1009 days.

(21) Appl. No.: 10/788,017

(22) Filed: Feb. 25, 2004

(51) Int. Cl.
*B01J 29/06* (2006.01)

(52) U.S. Cl. .............................. 502/60; 502/62; 502/64; 502/66; 502/69; 502/73; 502/74

(58) Field of Classification Search ................... 502/60, 502/62, 64, 66, 69, 73, 74
See application file for complete search history.

(56) References Cited

U.S. PATENT DOCUMENTS

| 6,676,919 | B1 | 1/2004 | Fischer et al. |
| 6,677,264 | B1 | 1/2004 | Klein et al. |
| 6,682,650 | B2 | 1/2004 | Honna et al. |

OTHER PUBLICATIONS

Coker, Presented on Feb. 28, 2003 @ Sandia National Laboratories.
Mowery-Evans, Presented on Feb. 27, 2003 @ Sandia National Laboratories.
Boyen, Science, Aug. 30, 2002, p. 1533-1536, vol. 297.
Cox, J. Chem Phys., Jan. 1, 1988, p. 111-119, vol. 88 (1).
De Graff, Journal of Catalysts, Jul. 2001, p. 307-321, vol. 203.
Joo, Nature, Jul. 12, 2001, p. 169-172 vol. 412.

*Primary Examiner*—Elizabeth D. Wood
(74) *Attorney, Agent, or Firm*—Elmer A. Klavetter

(57) ABSTRACT

A metal nanocluster composite material for use as a conductive catalyst. The metal nanocluster composite material has metal nanoclusters on a carbon substrate formed within a porous zeolitic material, forming stable metal nanoclusters with a size distribution between 0.6-10 nm and, more particularly, nanoclusters with a size distribution in a range as low as 0.6-0.9 nm.

7 Claims, No Drawings

METAL NANOPARTICLES AS A CONDUCTIVE CATALYST

This invention was made with Government support under Contract No. DE-AC04-94AL85000 awarded by the Department of Energy. The Government has certain rights in the invention.

BACKGROUND OF THE INVENTION

The invention describes a metal nanoparticle catalyst, and more particularly, a conductive catalyst utilizing noble metal nanoparticles on a carbon support within a zeolite matrix.

Metal nanoparticles have been shown to have utility as catalysts, where the size of the metal nanoparticles affect the catalytic activity. Small differences in particle size have been shown to affect catalytic activity for clusters of a few dozen atoms and smaller. It has been shown, for example, that the rate constant for the reaction with hydrogen of a cluster of 10 iron atoms is almost three orders of magnitude greater than that of either an 8- or a 17-atom cluster. The reactivity of clusters of 5 to 14 transition metal atoms with carbon monoxide was shown in an extensive study to vary by no more than factors of 2-3 as a function of cluster size and metal. Reducing the particle size, therefore, offers not only benefits in terms of an increase in catalyst dispersion (e.g., surface area available for reaction), but also potentially dramatic changes in the chemistry on the cluster surface. Furthermore, the size of the nanoparticles and nanoclusters can affect the stability of the nanocluster materials. For example, under conditions where bulk gold ($Au^o$) is oxidized to $Au_2O_3$ ($Au^{3+}$), clusters containing 55 gold atoms (1.4 nm diameter) were found to be highly stable compared to other clusters in the size range <1 to 7.9 nm.

Typically, metal nanoclusters are put on a support material when used as a catalyst. For example, noble-metal fuel cell catalysts are generally prepared by depositing metal nanoparticles or clusters onto a highly conductive support material, such as carbon. The conductivity of the support ensures that electron transfer efficiency is high.

One difficulty in catalysts used in hydrogen fuel cell electrodes is that high concentrations of platinum are generally required, 25-50 g per fuel cell stack for automotive applications. The high cost and scarce supplies of platinum are thus significant barriers toward the commercialization of fuel cell vehicles. Catalysts requiring platinum loadings of less than 5 g per vehicle or utilizing a more readily available active metal would boost the development of fuel cell powered vehicles.

Another problem associated with the preparation of such metal catalysts on a support, however, is the tendency of the metal clusters to aggregate during the thermal treatment required for activation, thus reducing the effective surface area for catalytic reaction and altering the chemistry of the metal surface. One way to reduce the aggregation behavior is to encapsulate the noble metal particles within a porous network, such as a zeolite, where cluster diffusion is reduced. Zeolite-supported metal clusters and particles are used in many commercial catalytic processes, including hydrotreating, hydrogenation/dehydrogenation, and environmental catalysts such as vehicle emission control. Zeolite-supported metal clusters, however, do not make good electro-active catalysts, since the zeolite matrix possesses relatively low conductivity.

DESCRIPTION OF SPECIFIC EMBODIMENTS

In the present invention, novel metal nanocluster materials on a conductive substrate are prepared. These materials have utility as catalysts in processes such as electro-oxidation of hydrogen and electro-reduction of oxygen in fuel cells. The materials produced can affect commercialization of fuel cell powered vehicles, as well as other fuel cell devices. The availability of fuel cell vehicles on the consumer market can subsequently reduce the dependence of the US on imports of foreign oil and, with replacement of conventional internal combustion engine-powered vehicles by fuel cell-powered vehicles, reduce environmental burdens.

Meso-porous silica-based materials have been shown as useful sacrificial templates for the formation of porous carbon networks, which can then be impregnated with metal nanoparticles. However, because the metal particles are deposited on the surface of the substrate (e.g., carbon), the particles are free to migrate and agglomerate on thermal activation, resulting in a loss of "active" metal surface atoms.

The materials prepared by the present invention are composites consisting of well-defined metal compound (where metal compound includes both elemental metal and multi-element metal materials) clusters on a carbon support (substrate) within a secondary aluminosilicate or non-aluminosilicate zeolite or zeolite-like matrix. The carbon support is required to make the resulting material a conductive catalyst. Any metal compound that can be prepared as nanoparticles, including elemental metals, as well as metal oxides and metal sulfides, can be utilized. In particular, useful materials that can be prepared as nanocluster materials on a substrate include, but are not limited to, titanium, vanadium, chromium, manganese, manganese oxide, iron, iron oxide, cobalt, nickel, copper, copper oxide, zinc, zinc oxide, gallium, germanium, zirconium, zirconium oxide, niobium, molybdenum, molybdenum disulfide, ruthenium, rhodium, palladium, silver, cadmium, cadmium selenide, tungsten, rhenium, iridium, platinum, gold, lead, bismuth, cerium, and cerium oxide, and any combinations thereof.

The particular zeolite or zeolite-like material is chosen based on its porosity and channel/pore size (which helps control metal nanocluster size), ion exchange capacity (which helps control the loading, that is, wt %, of metal in the material). Typically, a zeolite or zeolite-like material with high ion exchange capacity and large pores/cavities, such as zeolite X (Faujasite, FAU) can be used for the invention. The size of the metal-atom (or metal-compound) nanoclusters is controlled by encapsulation within the zeolite matrix. The metal-atom/zeolite composite material or metal compound/zeolite composite material is treated with an organic monomer which, upon polymerization and subsequent carbonization, is converted into carbon. The resultant material is a highly conductive carbon-metal compound-zeolite composite, from which the zeolite can be optionally removed.

To prepare the materials of the present invention, a zeolitic material is treated with an aqueous metal compound solution, such as a metal nitrate compound solution, a metal ammonium nitrate compound solution, a metal chloride compound solution, a metal ammonium chloride compound solution, a metal sulfate compound solution, a metal ammonium sulfate compound solution, a metal acetate compound solution and a metal ammonium acetate compound solution, where the metal can be titanium, vanadium, chromium, manganese, manganese oxide, iron, iron oxide, cobalt, nickel, copper, copper oxide, zinc, zinc oxide, gallium, germanium, zirconium, zirconium oxide, niobium, molybdenum, molybdenum disulfide, ruthenium, rhodium, palladium, silver, cadmium, cadmium selenide, tungsten, rhenium, iridium, platinum, gold, lead, bismuth, cerium, and cerium oxide. The aqueous metal compound solution can be represented as $M_x(NH_3)_yA_z$, where M is a metal ion, A is a counterbalancing ion chosen from, but not limited to $NO_3$, $Cl$, $O_2CCH_3$, $SO_4$, and x and z depend on the valence of M and A, to cause exchange of charge-balancing cations within the zeolite for $M(NH_3)_y^{n+}$ or $M^{n+}$ cations. The zeolite is then washed to remove excess metal and other species. The zeolitic material can optionally be pre-treated with an aqueous ammonium salt solution to remove some or all of metal ions pre-existing in the zeolitic material and replace them with $NH_4^+$.

The metal ion-exchanged zeolite (typically containing 1-30 wt.-% metal) is then treated at elevated temperature (e.g. 350° C.) in air or inert atmosphere to decompose the $M(NH_3)_y^{n+}$ or $M^{n+}$ ion and to remove more moisture, where n represents a valence state. The rate at which the temperature is ramped during the metal ion or metal complex ion decomposition has been demonstrated to be the critical step in defining cluster size and size distribution. The heating rate is suitably less than 2° C. per minute, and preferably less than 0.5° C. per minute. Once cooled, the partially dehydrated M-zeolite is contacted with an organic monomer capable of undergoing polymerization, e.g., furfuryl alcohol, vinyl acetate, sucrose, and nitro analine, optionally dissolved in a non-polymerizing solvent, e.g., ethanol, methanol, propanol, ethyl acetate, acetone, and diethylether. The ratio of monomer to zeolite can be adjusted in order to control the degree to which the pores of the zeolite are filled by said monomer.

The impregnated M-zeolite is then subjected to evacuation at room temperature to remove air from the pores and allow the monomer (and optional solvent) to penetrate the pore volume. The vacuum treatment has the added effect of removing optional solvent.

The M-zeolite/monomer is then treated at elevated temperature (typically 80-120° C.) for 2-12 hours in order to induce polymerization of said monomer to form a polymeric material within the cavities and pores, and on the external surface of the zeolite.

Subsequent treatment at temperatures in the range 350-900° C. under inert atmosphere or vacuum converts the zeolite-entrained polymer into conductive carbon.

Optional treatment at elevated temperature (350-900° C.) in a reducing atmosphere (e.g., 5% $H_2$ in inert carrier gas) ensures that all metal is reduced to elemental metal.

Optional treatment in a controlled environment (for example, chemical vapor, elevated temperature) can be used to convert some or all of the metal to a metal compound.

Depending upon the zeolite type, the thermal history of the material, and the nature of the metal introduced into the zeolite, X-ray diffraction shows that the zeolite component can remain intact or can degrade throughout the processing steps described above. The degradation of the zeolite structure is not deemed detrimental to the preferred embodiments of this invention, as metal nanocluster control is achieved prior to zeolite degradation.

The aluminosilicate zeolite phase can optionally be removed from the metal-compound carbon by acid or base treatment.

In one embodiment, a commercially available aluminosilicate zeolite was treated with an aqueous platinum salt solution (typically platinum (II) tetra-amine nitrate) to cause exchange of charge-balancing cations within the zeolite for $Pt(NH_3)_4^{2+}$ cations and yield a $Pt(NH_3)_4^{2+}$-exchanged zeolite with 1-25 wt. % Pt. The zeolite was then washed to remove excess platinum and other species. The Pt-exchanged zeolite was then optionally treated at 350° C. in air or inert atmosphere to decompose the $Pt(NH_3)_4^{2+}$ to $Pt^{2+}$ and $Pt^0$ and to remove more moisture. Nanoclusters ranging from sub-nanometer to approximately 10 nm in diameter result, the size and size distribution depending on the heating rate. Once cooled, the partially dehydrated Pt-zeolite was contacted with an organic monomer capable of undergoing polymerization, e.g., furfuryl alcohol, optionally dissolved in a non-polymerizing solvent, e.g., ethanol. The ratio of monomer to zeolite can be adjusted in order to control the degree to which the pores of the zeolite are filled by said monomer. The contact of the metal compound-zeolitic material with an organic compound allows stabilization of the metal compound nanoclusters and provides the means for electrical conduction required for an electrocatalyst.

The impregnated Pt-zeolite was then subjected to evacuation at room temperature to remove air from the pores and allow the monomer (and optional solvent) to penetrate the pore volume. The vacuum treatment had the added effect of removing optional solvent. The Pt-zeolite/monomer was then treated at elevated temperature (typically 80-120° C.) for 2-12 hours in order to induce polymerization of said monomer to form a polymeric material within the cavities and pores, and on the external surface of the zeolite. Subsequent treatment at temperatures in the range 350-900° C. under inert atmosphere converted the zeolite-entrained polymer into conductive carbon. Treatment at elevated temperature (350-900° C.) in a reducing atmosphere (e.g., 5% $H_2$ in inert carrier gas) ensured that all platinum was reduced to $Pt^0$. The aluminosilicate zeolite phase can optionally be removed from the platinum-carbon-zeolite composite by acid or base treatment. A Pt-carbon conductive catalyst is thus prepared with Pt nanoclusters having a size distribution in the range of less than 1 nm to 10 nm. Using other metal compound nanoclusters produces similar conductive catalysts.

Utilizing this method, particle sintering is avoided while maintaining high electronic conductivity, thus reducing the demand for high loading of platinum or other metals.

In another embodiment, a commercially available sodium zeolite X was ion exchanged with $Pt(NH_3)_4(NO_3)_2$ to yield a $Pt(NH_3)_4^{2+}$-zeolite containing 20 wt. % Pt. Zeolite X is isostructural with the mineral faujasite and possesses a framework Si:Al ratio between approximately 1:1 and 1.6:1. The porosity of zeolite X when dehydrated is about 50%, characterized by a 0.74 nm pore opening, with internal cavities of 1.3 nm diameter. The 20 wt. % Pt zeolite was calcined at 0.1° C./min to 350° C. in air, resulting in Pt nanoclusters in the range of 0.6 to 0.9 nm. Once cooled to room temperature, said nanocluster-containing material was infiltrated with an ethanolic solution of furfuryl alcohol. The amount of furfuryl alcohol was calculated to fill the remaining pore volume of the Pt-zeolite, and ethanol was added to give a furfuryl alcohol:ethanol ratio of approximately 1:3. The material was then evacuated to fill the porosity of the material with furfuryl alcohol and remove excess ethanol. The material was then heated to 80° C. in air to ensure complete polymerization of the furfuryl alcohol. The polymer-containing Pt-zeolite was heated at 5° C./min to 600° C. under inert atmosphere to convert the poly-furfuryl alcohol into carbon. Only minor sintering of the Pt clusters occurred during the carbonization process, whereas in the absence of polymer, significant sintering occurred. $^{13}C$ MAS NMR showed a transition from mostly $sp^3$ carbon in the polymer-containing Pt-zeolite to mostly $sp^2$ in the carbonized material, in agreement with the formation of graphitic sheets. Furthermore, initial electrochemical tests indicated that the platinum in these samples was electroactive, and that the carbon matrix was conductive. Chemisorption measurements indicated that a fraction of the Pt clusters were embedded in carbon and invisible to the gas phase. The resulting conductive catalyst within the zeolite matrix had a composition of 17-20 wt % Pt, 3-25 wt % C, 31-35 wt % $SiO_2$, 29-32 wt % $Al_2O_3$, 3-4 wt % $Na_2O$, and the remainder water. After the material has been acid-washed to remove zeolitic material, the corresponding compositions are: 43-80 wt % Pt; 12-62 wt % C; 0-5 wt % $SiO_2$; 0-4 wt % $Al_2O_3$; <1 wt % $Na_2O$ and the balance $H_2O$.

In a further embodiment, a commercially available sodium zeolite X was ion exchanged with $NH_4^+$ by contacting it with an aqueous solution of ammonium nitrate. The exchange reaction was repeated a number of times to ensure all, or the majority of, $Na^+$ initially in the zeolite had been replaced by $NH_4^+$. The ammonium-exchanged zeolite was then treated with an aqueous solution of $Pt(NH_3)_4(NO_3)_2$ to induce ion exchange and yield a $Pt(NH_3)_4^{2+}$-zeolite containing 20 wt. % Pt. The 20 wt. % Pt zeolite was calcined at 0.1° C./min to 350° C. in air, resulting in Pt nanoclusters in the range of 0.6 to 0.9 nm. Once cooled to room temperature, said nanocluster-containing material was infiltrated with an ethanolic solution of furfuryl alcohol. The amount of furfuryl alcohol was calculated to fill the remaining pore volume of the Pt-zeolite, and ethanol was added to give a furfuryl alcohol:ethanol ratio of approximately 1:3. The material was then evacuated to fill the porosity of the material with furfuryl alcohol and remove excess ethanol. The material was then heated to 80° C. in air to ensure complete polymerization of the furfuryl alcohol. The polymer-containing Pt-zeolite was heated at 5° C./min to 600° C. under inert atmosphere to convert the poly-furfuryl alcohol into carbon. This material is different from that given in the earlier embodiment in that it contains no, or only trace amounts of sodium, which is known to act as a poison to some catalytic reactions.

In other embodiments, varying the composition of the metal salt, such as a Pt salt, used as well as the specific zeolite material, results in nanoclusters with sizes ranging from less than one nanometer to approximately 10 nm or more. These nanoclusters are situated within the zeolite structure or degraded zeolite matrix with the remaining pore volume of the zeolite or degraded zeolite occupied by a carbonaceous matrix. This matrix imparts electronic conductivity to the material, and also serves to stabilize the clusters against thermally induced aggregation, or sintering. Utilizing the method of the present invention, metal/zeolite/carbon materials are formed with compositions within the ranges:

| | |
|---|---|
| metal | 1-30 wt.-% |
| C | 3-25 wt.-% |
| $SiO_2$ | 22-45 wt.-% |
| $Al_2O_3$ | 2-22 wt.-% |
| $Na_2O$ | 0-13 wt.-% |
| $H_2O$ | balance |

The $Na_2O$ represents residual sodium in the zeolite, in cases where an initial ammonium exchange reaction was not carried out, and varies inversely with metal loading (e.g., not all $Na^+$ has been ion exchanged with $Mn^{n+}$). In cases where an initial ammonium exchange reaction was carried out, the amount of $Na_2O$ is essentially zero.

When the zeolite is selectively dissolved out of the composite materials with compositions noted above, a highly porous metal nanocluster/carbon material with a narrow distribution of metal nanoclusters remains. The compositions of these materials formed by the method of the present invention are:

| | |
|---|---|
| metal | 6-80 wt.-% |
| C | 20-94 wt.-% |
| $SiO_2$ | 0-5 wt.-% |
| $Al_2O_3$ | 0-4 wt.-% |
| $Na_2O$ | 0 wt.-% |
| $H_2O$ | balance |

The nanoclusters formed have been shown to be stable to thermal treatment up to 600° C. when an organic polymer is present (cluster size hardly affected), and unstable when no polymer is present (cluster size almost doubled). This exemplifies how the carbon matrix stabilizes the clusters to thermal treatment. Removal of the zeolite phase by acid or base treatment results in improvement of the electro-activity of the catalysts, as measured by standard electrochemical techniques.

In other embodiments that demonstrate the effect of the heating rate, Pt nanocluster materials were formed according to the method of the present invention with the heating rate during the metal cluster decomposition step at 2° C./min in air up to a temperature of 400° C. Using x-ray diffraction (XRD) analysis and transmission electron microscopy (TEM) imaging, nanoclusters between approximately 3 and 6 nm resulted with a bulk surface area of 470 $m^2/g$. If the heating rate is decreased to 1° C./min, then the size decreases to approximately 0.8-1.2 nm with a surface area of approximately 450 $m^2/g$. If the heating rate is decreased to 0.1° C./min (to 350° C.), then the size decreases to approximately 0.6-0.9 nm with a surface area of approximately 310 $m^2/g$. The results show that the nanocluster size can be controlled by controlling the heating rate, with slower heating rates yielding smaller sizes that can be beneficial in preparing catalytic materials.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A metal nanocluster composite conductive catalytic material, comprising metal nanoclusters on a carbon substrate within a porous zeolitic material, said metal nanoclusters having a size distribution in the range of 0.6-10 nm, said metal nanocluster composite conductive catalytic material having a composition of 1-30 wt % metal; 3-25 wt % carbon, 22-45 wt % $SiO_2$, 2-22 wt % $Al_2O_3$, 0-13 wt % $Na_2O$, and the balance water.

2. The nanocluster composite conductive catalytic material of claim 1, said metal nanoclusters having a size distribution in the range of 0.6-0.9 nm.

3. The nanocluster composite conductive catalytic material of claim 1 wherein said metal nanoclusters comprise at least one metal compound selected from titanium, vanadium, chromium, manganese, manganese oxide, iron, iron oxide, cobalt, nickel, copper, copper oxide, zinc, zinc oxide, gallium, germanium, zirconium, zirconium oxide, niobium, molybdenum, molybdenum disulfide, ruthenium, rhodium, palladium, silver, cadmium, cadmium selenide, tungsten, rhenium, iridium, platinum, gold, lead, bismuth, cerium, and cerium oxide.

4. The method of claim 2 wherein said metal nanoclusters are Pt nanoclusters.

5. The metal nanocluster composite conductive catalytic material of claim 1 wherein the composition has less than 1 wt % $Na_2O$.

6. The method of claim 1 wherein said zeolitic material is an aluminosilicate zeolite.

7. The method of claim 1 wherein the porous zeolitic material is a sodium zeolite with a framework Si:Al ratio greater than approximately 1:1 and less than approximately 1.6:1.

* * * * *